United States Patent [19]

Estaque

[11] 4,114,480
[45] Sep. 19, 1978

[54] CONTROL DEVICES FOR TRANSMISSIONS OF AUTOMOTIVE VEHICLE ENGINES

[75] Inventor: André Estaque, Bagneux, France

[73] Assignee: Societe Anonyme Automobiles Citroen, Paris, France

[21] Appl. No.: 758,771

[22] Filed: Jan. 12, 1977

[30] Foreign Application Priority Data

Jan. 13, 1976 [FR] France .................................. 76 00710

[51] Int. Cl.² ............................................ B60K 41/18
[52] U.S. Cl. ..................................................... 74/865
[58] Field of Search ................. 74/865, 873, 870, 861, 74/871

[56] References Cited

U.S. PATENT DOCUMENTS

| 2,958,234 | 11/1960 | Oehrli ..................................... 74/865 |
| 3,368,426 | 2/1968 | Kraig et al. ............................. 74/865 |

*Primary Examiner*—Samuel Scott
*Assistant Examiner*—Frank H. McKenzie, Jr.

*Attorney, Agent, or Firm*—Poms, Smith, Lande & Glenny

[57] ABSTRACT

The invention relates to a correcting device for controlling the normal operating speed of an automotive engine with a variable speed transmission.

The variable speed transmission incorporates a hydraulic control mechanism of which a movable member is connected to the actuating member of the speed reduction ratio control device, and is capable of being placed in communication selectively with a pressure fluid source and a reservoir through a distributing valve. A slide of the distributing valve is so connected that their actions oppose one another to a centrifugal governor and a resilient member connected to the acceleration control pedal of the vehicle through a pivotal lever. A movable part is connected to the speed reduction ratio control device and is disposed opposite the lever and serves as an abutment limiting the pivotal movement of the lever.

4 Claims, 2 Drawing Figures

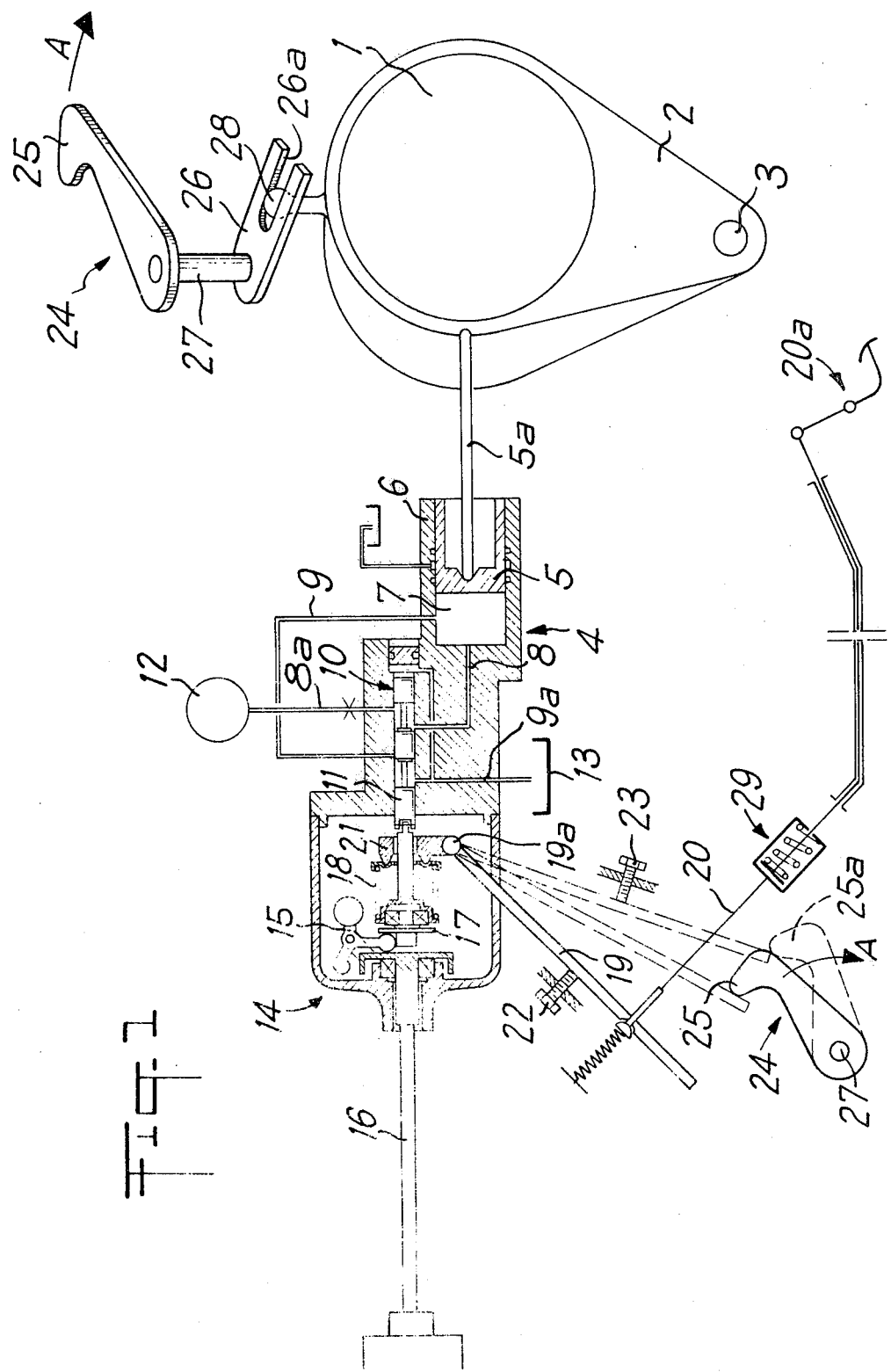

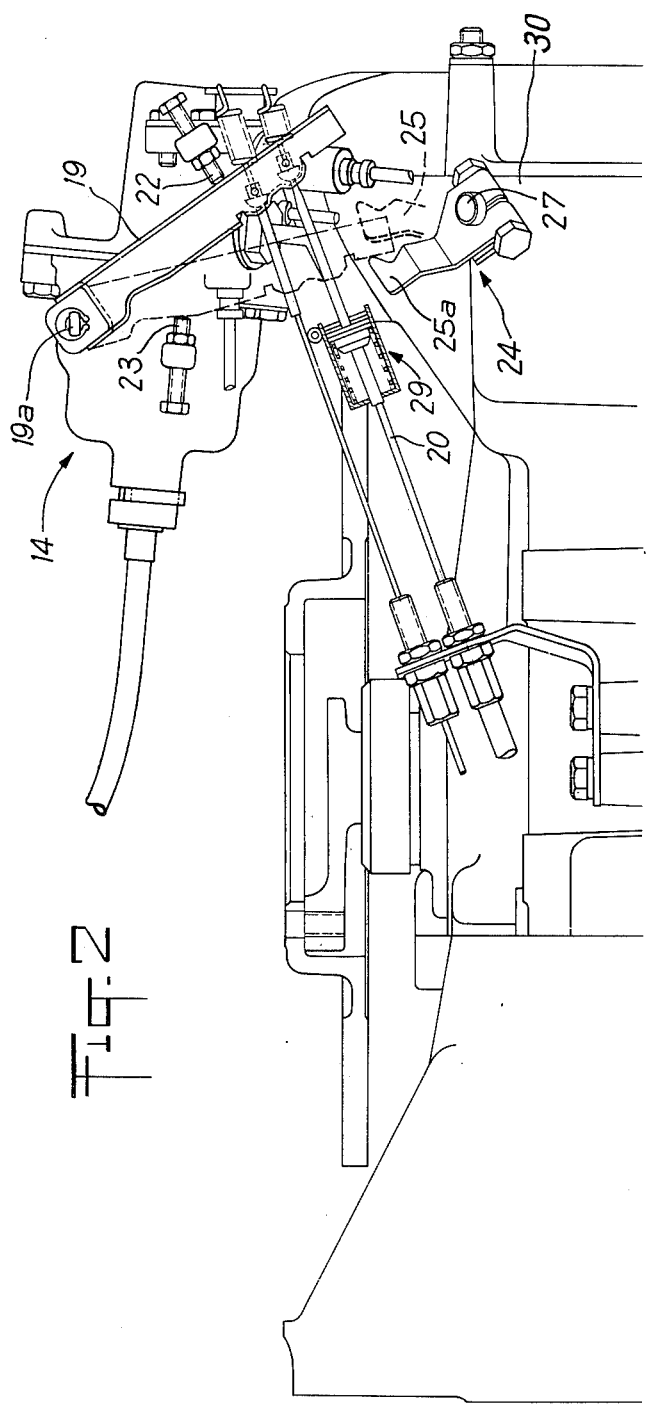

CONTROL DEVICES FOR TRANSMISSIONS OF AUTOMOTIVE VEHICLE ENGINES

BACKGROUND OF THE INVENTION

1. Field of the Invention

The present invention relates to a device for correcting the speed of an automotive vehicle engine provided with a variable speed transmission equipped with a mechanism for controlling its operation.

2. Summary of the Prior Art

In automotive vehicle transmissions with change-speed mechanisms, it is known to provide for control of the operation of the change-speed mechanism by means of a control mechanism. This mechanism generally comprises a hydraulic senser having a movable part capable of actuating the control member for speed reduction of the change-speed mechanism. The hydraulic senser is arranged either to be supplied with pressure fluid, or to communicate with exhaust by means of a distributor valve, of which the slide is subjected to opposing forces, generated by a centrifugal governor, and a resilient member.

The centrifugal governor exerts an action which is a function of the speed of rotation of the engine. The resilient member is connected to an acceleration control member of the vehicle or to the accelerator pedal. When the action of the centrifugal governor is overriding, the slide of the distributor valve is so disposed that the hydraulic senser effects a reduction in the speed-reducing ratio. In contrast, when the action of the resilient member is overriding, the distributor valve slide is displaced into a position such that the hydraulic senser effects an increase in the reduction ratio.

In the case when the change-speed mechanism is in its position for greatest speed reduction ratio and substantial acceleration is required, the vehicle being stationary, the engine speed rapidly increases to normal speed and uses a part of its power to accelerate itself. At the instant when the engine reaches the controlled normal operating speed, it can then generate its full power and it gives rise to hesitation in operation if the engine operating speed is high. If it is low this hesitation in operation will not happen. Moreover, the time response of the centrifugal governor is such that when the engine increases in speed to its operating speed very rapidly, it may exceed its control speed before the governor has reacted thus giving rise to another cause of hesitation in operation or momentary stall at the instant when it acts. It is therefore necessary to limit the control operating speed of the engine in the case where the change-speed mechanism is in its position of greatest speed reduction and when high acceleration is required.

Systems limiting the normal operating speed of an engine are known, when the speed of the vehicle is low such that the speed governor is in a position of high reduction and the accelerator pedal is kicked down. These control systems include centrifugal governors rotated by the output shaft of the change speed mechanism and of which the action tends to oppose the action of the centrifugal governor.

An object of the present invention is to resolve the problem posed by means of a correcting device having a simple kinematic form enabling the omission of accessories, often of complex form, in the transmission system.

SUMMARY OF THE INVENTION

With this object in view, the invention relates to a correcting device for the normal operating speed of an automotive vehicle engine provided with a change-speed gear or variable speed transmission equipped with a mechanism for controlling its operation. The said correcting mechanism comprises a hydraulic senser, of which the movable member is connected to the control member of the speed reduction of the gear or transmission, capable of being placed in communication selectively with a pressure fluid source and with a reservoir through the intermediary of a distributor valve of which the slide is connected in opposition to a centrifugal governor, of which the action is a function of the speed of rotation of the engine and, to a resilient member connected to an acceleration control member of the vehicle by means of a pivotal lever.

According to the invention, a movable part connected to the control member for producing speed reduction is disposed opposite the lever and constitutes and abutment limiting the pivotal movement of the lever owing to the actuation of the acceleration control member, to a variable value which is a function of the position of the control member for speed reduction of the speed-reducing gear or transmission. Preferably, the part is rotatable.

In a preferred embodiment of the invention, the member for controlling the speed reduction of the change-speed gear or variable transmission is formed in a manner known per se by an assembly carrying friction members co-operating with the interior of a casing with friction members carried by input and or output shafts of the change-speed gear. The aforesaid movable part is then constituted by two levers rigid with a shaft mounted for rotation in the said casing, one of the two within the said casing co-operating through the intermediary of a slide with a ball carried by the assembly, the second externally of the casing extending at least by its end portion into the plane of the said pivotal lever. Preferably, the lever will be connected to the acceleration control member through the intermediary of a resilient member.

BRIEF DESCRIPTION OF THE DRAWINGS

FIG. 1 is a diagrammatic view of a correcting device embodying the invention; and FIG. 2 is a partial external view illustrating the mechanical arrangement of the embodiment of FIG. 1.

DESCRIPTION OF THE PREFERRED EMBODIMENT

Referring to FIG. 1, an input device 1 of a change-speed gear or variable transmission is shown and is termed the "primary rotor." The input device 1 is mounted on an assembly 2, pivotal about a shaft 3. Such a transmission comprises assemblies of corresponding members with friction discs mounted for rotation in the assembly 2 and co-operating with corresponding disc assemblies provided on input shafts and output shafts of the change-speed gear. This arrangement is disclosed for example in U.S. Pat. No. 3,381,777 to Jacques Flichy issued May 7, 1968. The pivotal movement of the assembly 2 about the shaft 3 is controlled leftwards (not shown) by a return member, and towards the right by a regulating device 4.

The regulating device 4 comprises a piston, the rod 5a of which is connected to the assembly 2. The piston is slidable in a fixed cylinder 6 and defines a chamber 7 therein which is connected to a supply passage 8 and an exhaust passage 9 provided for discharging fluid from the chamber. A distributing valve 10 with a slide 11 having three positions serves to control flow in the passages 8 and 9. In a first position of the slide, the distributing valve 10 provides communication between the passage 8 and a pipe 8a for supplying pressure fluid from a reservoir 12 and isolates the passage 9, in particular from a discharge pipe 9a delivering to a reservoir 13. In a second position, the slide of the distributing valve provides communication between the passage 9 and the pipe 9a and isolates the passage 8 from the pipe 8a. Finally, in the third position of the slide, the distributing valve 10 isolates simultaneously the passages 8 and 9 respectively from the pipes 8a and 9a.

The slide 11 is actuated for displacement at one of its ends by a control member 14. This member 14 comprises a centrifugal governor 15 rotatable on a shaft 16, itself connected to the cam shaft (not shown) of the engine. The governor 15 contacts a plate 17 rigid with the slide 11. The member 14 also includes a resilient member 18 abutting against the plate 17 and provides a bias acting against the action of the governor 15. The force in the resilient member 18 is a function of the inclination of the lever 19 which, is under the action of a tension cable 20 actuated by the accelerator pedal 20a of the vehicle pivoted by a linkage about a fixed point 19a and compresses the device 18 to a greater or lesser extent through the intermediary of a plate 21.

The lever 19 is pivotal between two adjustable abutments 22 and 23. When the lever 19 is in contact with the abutment 22, it is in a position corresponding to engine operation at for example 3000 revolutions per minute. When the lever 19 is, contrariwise, in contact with the abutment 23, it is then in a position corresponding to maximum permitted engine speed, for example 5000 revolutions per minute. A movable part 24, lying opposite to the free end of the lever 19, constitutes a third, movable, abutment to limit the pivotal movement of this lever about the axis 19a. The abutment 24 is constituted by two levers 25 and 26 rigidly interconnected by a shaft 27, which shaft is mounted for rotation in the casing (not shown) of the change-speed transmission. The said lever 26 has a bifurcated slide 26a in which a ball 28 is slidable, rigid with the assembly 2. The rotation of the assembly 21 about the shaft 3 causes rotation of the lever 25 about the shaft 27, through the lever 26 and the ball 28. The movable abutment 24 is shown in FIG. 1 in plan in the neighbourhood of the lever 19 in order to illustrate the relative functional arrangement existing between the abutment and the lever, and also in the neighbourhood of the assembly 2 in order to illustrate the functional relations existing between the abutment and the assembly 2.

FIG. 2 illustrates, as an external fragmentary view of the correcting device in accordance with the invention, the relative positions of the abutment 24 and the lever 19.

FIG. 1 also shows a resilient lost-motion device 29 interposed in a cable 20 accommodating displacements of the accelerator pedal 20a, when the lever 19 is in abutment either against the abutment 23 or against the abutment 24.

In FIG. 2 certain parts described in relation to FIG. 1 will again be apparent and the same references are employed. This Figure, as indicated above, illustrates the relative positions of the lever 19 and the movable abutment 24.

The assembly 2 can take up two extreme positions corresponding respectively to the smallest speed reduction and the greatest speed reduction of the change-speed transmission; it follows that the lever 25 can also take up two positions by rotation about the shaft 27 mounted for rotation in the wall of the casing 30 surrounding the assembly 2 of the change-speed transmission, the one reference 25a in FIGS. 1 and 2 corresponding to the position for the smallest speed reduction of the assembly 2 and the other reference 25 in the same Figures corresponding to the position of greatest speed reduction of the assembly 2. It will be noted that the position 25a is a position spaced from the abutment 24, that is to say that the lever 19 can then contact the abutment 23. In this position 25, the movable abutment 24 limits the pivotal action of the lever 19 to a value corresponding for example to an engine speed to the order of 4000 revolutions per minute.

The operation of the corresponding device in accordance with the invention is as follows. When the action of the lever 19 is overriding over that of the centrifugal governor 15, that is to say when the driver causes an acceleration of the vehicle or when the load of the vehicle increases, for example on a slope, the engine speed falls, the slide 11 of the distributing valve moves leftwards and the passages 8 and 8a are placed in communication while the passage 9 is cut-off from the pipe 9a. Fluid under pressure is thereby admitted to the chamber 7. The piston is thus displaced to the right and displaces the assembly 2 in the sense to produce a greater speed reduction.

In response, the engine speed increases and the governor 15 rotates more rapidly, counterbalancing the action of the lever 19 until it is in equilibrium. The slide 11 is then in a neutral position, which signifies that the chamber 7 is isolated both from the admission and the discharge connections. The assembly 2 is then stationary.

If, in contrast, the driver slightly relaxes pressure on the acceleration control 20a or if the speed of the motor has a tendency to increase, for example on a downward slope of the road, the action of the governor 15 is overriding and the slide 11 is pushed towards the right, that is to say in a position to communicate the chamber 7 with the outlet or exhaust. Under the action of the return member incorporated in the assembly 2, the latter returns to a position for lower speed reduction, since the piston 5 will no longer encounter resistence due to the fluid trapped in the chamber 7. The engine speed falls until a fresh equilibrium of the slide 11 is established.

Consideration will now be given to the special case where, by means of a known device, the assembly 2 is in its position of large speed reduction and the driver of the vehicle kicks down the accelerator pedal 20a. In the absence of the movable abutment 24, the lever 19 is, by this action of the driver, force against the abutment 23. The resilient member 18 then exerts an overriding action on the slide 11 of the distributing valve 10 and the chamber 7 is kept in communication with the pressure source 12. This results in maintenance of the position of high speed reduction of the assembly 2. It is then necessary to wait until the engine has reached or even exceeded the value corresponding to the control exerted by the abutment 23 in order that the governor 15 should have an effect, which can counterbalance the action of the lever 19.

The abutment 24, because of the position of high speed reduction of the assembly 2, is at the instant when the driver pushes down the accelerator pedal 20*a* in its reference position 25. The lever 19 is then arrested during its pivotal movement by the abutment 24. This position corresponds to an intermediate speed of the engine, for example 4000 r.p.m.; the centrifugal governor 15 will counterbalance the action of the resilient member 18 resulting from this position of the lever 19, when the speed range of the engine will have reached the required 4000 r.p.m. However, equalibrium will not be achieved because of the pedal 20*a* being pushed to its lowest position, which is possible owing to the resilient member 29 which effectively allows extension of the cable 20, in spite of the abutment of the lever 19, the engine will exceed this speed of 4000 revolutions per minute and the governor 15 will have an overriding action on that of the member 18.

The distributing valve will then place the chamber 7 in the exhaust position and will permit the assembly 2 to move towards the position giving a lower speed reduction. The rate of increase in the engine speed will then reduce and stabilize while by means of the ball 28 driving the lever 26 through the slide 26*a*, the assembly 2 causes rotation of the movable abutment 24 in a sense indicated by the arrow A, thus enabling the lever 19 to take up a position corresponding to an engine speed in excess of 4000 revolutions per minute. The engine speed continuing, however, to increase, the action of the governor 15 becomes more and more overriding, and enables a fresh displacement towards the position of lower speed reduction of the assembly 2, which causes fresh rotation of the movable abutment 24, and therefore blocks progressively the path of the lever 19 in order finally to free this lever, so that it can abut against the abutment 23 corresponding to the maximum speed zone of the engine, for example 500 r.p.m. before the assembly 2 has reached its position for the lowest speed reduction of the change-speed transmission.

It will be apparent that the invention by use of a simple device enables control of the increase in operational speed of the engine of an automobile vehicle, of which the control member for acceleration is used vigorously by the driver, whilst the change-speed transmission is in its position of high speed-reduction. This is particularly the case, when the vehicle is being driven in town.

What is claimed is:

1. In a change-speed transmission for an automotive vehicle engine,
    means for controlling the operation of the transmission, including
    a hydraulic sensor incorporating
        a movable member and
        a control member of the transmission connected to the movable member of the sensor,
    a pressure fluid source,
    a reservoir,
    distributing valve means arranged to place the sensor selectively in communication with the fluid pressure source and the reservoir, said valve means incorporating
    slide means
    a centrifugal governor,
    a resilient member and
    a pivotal lever arranged to interconnect the resilient member and an accelerator control member of the automotive vehicle, the slide means being connected to the centrifugal governor and to the resilient member so that the forces exerted are opposed to one another, and
    a movable abutment connected to the control member of the transmission and disposed opposite the pivotal lever to limit its pivotal motion due to the acceleration control member to a value which varies as a function of the position of the control member of the transmission.

2. A transmission according to claim 1, wherein the movable abutment is pivotally mounted about a fixed axis normal to the plane in which the pivotal lever moves.

3. A transmission according to claim 2, wherein the transmission includes an assembly having
    a casing containing the assembly,
    an input shaft, and
    an output shaft
and wherein the improvement is characterized by
    a ball member carried by the assembly, and the movable abutment comprising
    a first lever, disposed internally of the casing, incorporating a slide
    a second lever, and
    a shaft rotatably mounted in the casing and rigidly connecting the first and second levers,
    the second lever disposed externally of the casing extending at least with its free end into the plane of movement of the said pivotal lever.

4. A transmission according to claim 1, comprising a lost-motion device interposed between the pivotal lever and the acceleration control member.

* * * * *